(12) United States Patent
Park et al.

(10) Patent No.: US 11,708,531 B2
(45) Date of Patent: *Jul. 25, 2023

(54) LIQUID CRYSTAL COMPOSITION AND DISPLAY DEVICE HAVING THE SAME

(71) Applicant: Samsung Display Co., Ltd., Yongin-si (KR)

(72) Inventors: Heung Shik Park, Seoul (KR); Kyeong Jong Kim, Suwon-si (KR); Ho Kil Oh, Seoul (KR); Jae Soo Jang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,257

(22) Filed: Jan. 18, 2021

(65) Prior Publication Data

US 2021/0230482 A1 Jul. 29, 2021

(30) Foreign Application Priority Data

Jan. 29, 2020 (KR) .......... 10-2020-0010266
Oct. 21, 2020 (KR) .......... 10-2020-0136756

(51) Int. Cl.
| | |
|---|---|
| *G02F 1/1333* | (2006.01) |
| *C09K 19/44* | (2006.01) |
| *C09K 19/12* | (2006.01) |
| *C09K 19/30* | (2006.01) |

(52) U.S. Cl.
CPC .............. *C09K 19/44* (2013.01); *C09K 19/12* (2013.01); *C09K 19/3003* (2013.01); *C09K 2019/122* (2013.01); *C09K 2019/301* (2013.01); *C09K 2019/3004* (2013.01); *C09K 2019/3016* (2013.01)

(58) Field of Classification Search
CPC .... C09K 19/44; C09K 19/12; C09K 19/3003; C09K 19/3491; C09K 19/3098; C09K 2019/122; C09K 2019/3004; C09K 2019/301; C09K 2019/3016; C09K 2019/0448; C09K 2019/3027; C09K 2019/3408; G02F 1/1333
See application file for complete search history.

(56) References Cited

U.S. PATENT DOCUMENTS

| | | | | |
|---|---|---|---|---|
| 9,280,016 | B2* | 3/2016 | Tago | G02F 1/133371 |
| 9,512,102 | B2* | 12/2016 | Reiffenrath | C07D 333/76 |
| 10,538,704 | B2* | 1/2020 | Archetti | C09K 19/12 |
| 11,242,487 | B2* | 2/2022 | Kang | C09K 19/44 |
| 2015/0123032 | A1 | 5/2015 | Sudo et al. | |
| 2018/0010045 | A1 | 1/2018 | Bae et al. | |
| 2019/0241809 | A1* | 8/2019 | Klasen-Memmer | C09K 19/542 |
| 2019/0300791 | A1* | 10/2019 | Kirsch | C09K 19/3098 |
| 2021/0230482 | A1* | 7/2021 | Park | C09K 19/44 |
| 2021/0261863 | A1* | 8/2021 | Kim | G02F 1/137 |

FOREIGN PATENT DOCUMENTS

| | | | | |
|---|---|---|---|---|
| JP | 2019-077792 | | 5/2019 | |
| KR | 10-2018-0006522 | | 1/2018 | |
| KR | 10-2006209 | | 8/2019 | |
| WO | 2019100876742 | * | 3/2019 | ............ C09K 19/44 |

* cited by examiner

*Primary Examiner* — Geraldina Visconti
(74) *Attorney, Agent, or Firm* — H.C. Park & Associates, PLC

(57) ABSTRACT

A liquid crystal composition for a display device, the composition includes compounds of Chemical Formulae 1-7 with the amounts and compounds defined herein.

20 Claims, 11 Drawing Sheets

LIQUID CRYSTAL COMPOSITION AND DISPLAY DEVICE HAVING THE SAME

CROSS REFERENCE TO RELATED APPLICATION

This application claims priority from and the benefit of Korean Patent Application No. 10-2020-0010266 filed on Jan. 29, 2020, and No. 10-2020-0136756 filed on Oct. 21, 2020, which are hereby incorporated by reference for all purposes as if fully set forth herein.

BACKGROUND

Field

Exemplary implementations of the invention relate generally to a liquid crystal composition and, more particularly, to a display device including the same.

Description of the Background

With the development of multimedia, the significance of display devices is increasing. Accordingly, various types of display devices such as a liquid crystal display (LCD) and an organic light emitting diode (OLED) display are used.

Among these devices, a LCD is one of the most widely used flat panel display devices today, and includes two substrates on which field generating electrodes such as a pixel electrode and a common electrode are formed and a liquid crystal layer interposed therebetween. A LCD generates an electric field in a liquid crystal layer by applying a voltage to the field generating electrodes, and displays an image by determining the direction of liquid crystal molecules of the liquid crystal layer and controlling the polarization of incident light.

The above information disclosed in this Background section is only for understanding of the background of the inventive concepts, and, therefore, it may contain information that does not constitute prior art.

SUMMARY

Applicant realized that the response speeds of conventional LCD are not ideal and hinder performance of the device, including after images.

Liquid crystal compositions and display devices constructed according to the principles and exemplary implementations of the invention have an improved response speeds. For example, liquid crystal compositions made according to one or more the exemplary embodiments may have increased refractive index anisotropy (Δn) and decreased dielectric anisotropy (Δε) and display devices including the liquid crystal composition may improve the response speed of liquid crystals by reducing the cell gap of the liquid crystal panel.

Additional features of the inventive concepts will be set forth in the description which follows, and in part will be apparent from the description, or may be learned by practice of the inventive concepts.

According to one aspect of the invention, a liquid crystal composition for a display device, the composition includes:

about 20 to about 60 parts, by weight, of at least one compound represented by Chemical Formula 1;

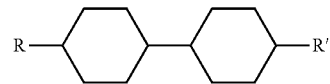

Chemical Formula 1 about 5 to about 18 parts, by weight, of at least one compound represented by Chemical Formula 2;

Chemical Formula 2 about 5 to about 18 parts, by weight, of at least one compound represented by Chemical Formula 3;

Chemical Formula 3 about 5 to about 35 parts, by weight, of at least one compound represented by Chemical Formula 4;

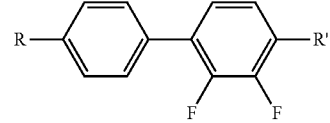

Chemical Formula 4 about 1 to about 8 parts, by weight, of a compound represented by Chemical Formula 5;

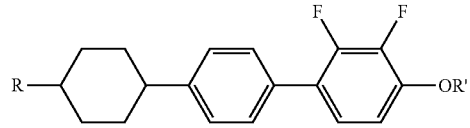

Chemical Formula 5 about 1 to about 8 parts, by weight, of a compound represented by Chemical Formula 6;

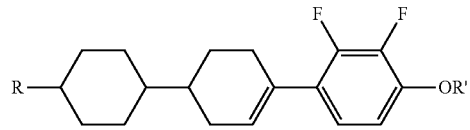

Chemical Formula 6 and about 1 to about 15 parts, by weight, of a compound represented by Chemical Formula 7:

Chemical Formula 7

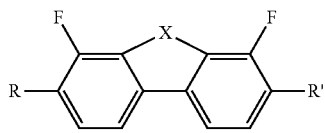

with respect to 100 parts by weight of the entire composition, wherein R and R' are each, independently from one another, an alkyl or alkenyl group having 1 to 7 carbon atoms in Chemical Formulas 1 to 7, and X is S or O in Chemical Formula 7.

The compound represented by Chemical Formula 1 may include a first compound in which R and R' are, independently from one another, alkyl groups, and a second compound in which R may be an alkyl group or an alkenyl group, and R' may be an alkyl group if R is an alkenyl group and R' is an alkenyl group if R is an alkyl group.

The content of the second compound may be about 18 to about 36 parts, by weight, with respect to 100 parts, by weight, of the compound represented by Chemical Formula 1.

A compound may be represented by Chemical Formula 8:

Chemical Formula 8

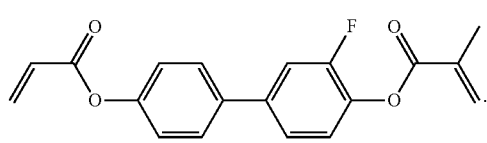

The content of the compound represented by Chemical Formula 8 may be about 0.2 to about 0.5 parts by weight with respect to 100 parts by weight of the liquid crystal composition.

The liquid crystal composition may have a refractive index anisotropy of about 0.097 to about 0.137.

The liquid crystal composition may have a dielectric anisotropy of about −3.2 to about −2.2.

The liquid crystal composition may have an elastic modulus of about 13 to about 17 pN.

According to another aspect of the invention, a display device includes: a first substrate including a pixel electrode; a second substrate including a common electrode; and a display panel interposed between the first substrate and the second substrate, and including a liquid crystal layer, wherein the display panel has a phase difference of about 285 to about 325 nm, and the liquid crystal layer comprises a liquid crystal composition having a refractive index anisotropy of about 0.097 to about 0.137, a dielectric anisotropy of about −3.2 to about −2.2 and an elastic modulus (K33) of about 13 to about 17 pN.

The liquid crystal layer may have a cell gap of about 2.0 to about 2.6 μm.

The liquid crystal composition may have a compound represented by Chemical Formula 6:

Chemical Formula 6

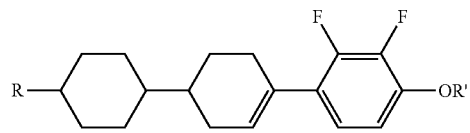

wherein R and R' may each independently an alkyl or alkenyl group having 1 to 7 carbon atoms in Formula 6.

The compound represented by Chemical Formula 6 may be included in about 1 to about 8 parts, by weight, with respect to 100 parts, by weight, of the liquid crystal composition.

The liquid crystal composition may have a compound be represented by Chemical Formula 7:

Chemical Formula 7

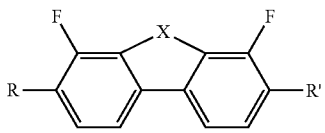

R and R' may be each, independently from one another, an alkyl or alkenyl group having 1 to 7 carbon atoms, and X is S or O in Formula 7.

The compound represented by Chemical Formula 7 may be included of about 1 to about 15 parts, by weight, with respect to 100 parts, by weight, of the liquid crystal composition.

The liquid crystal composition may further include about 20 to about 60 parts, by weight, of at least one compound represented by Chemical Formula 1;

Chemical Formula 1

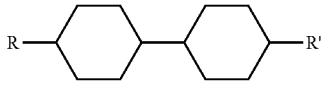

about 5 to about 18 parts, by weight, of a compound represented by Chemical Formula 2;

Chemical Formula 2

about 5 to about 18 parts, by weight, of a compound represented by Chemical Formula 3;

Chemical Formula 3

about 5 to about 35 parts, by weight, of a compound represented by Chemical Formula 4; and Chemical Formula 4

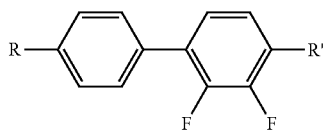

about 1 to about 8 parts, by weight, of a compound represented by Chemical Formula 5:

Chemical Formula 5

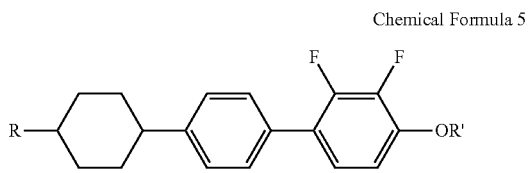

with respect to 100 parts, by weight, of the liquid crystal composition, R and R' may be each, independently from one another, an alkyl or alkenyl group having 1 to 7 carbon atoms in Chemical Formulas 1 to 5.

The compound represented by Chemical Formula 1 may include a first compound in which R and R', independently from one another, are alkyl groups, and a second compound in which R may be an alkyl group or an alkenyl group, and R' is an alkyl group if R is an alkenyl group and R' is an alkenyl group if R is an alkyl group.

The content of the second compound may be about 18 to about 36 parts, by weight, with respect to 100 parts, by weight, of the compound represented by Chemical Formula 1.

The liquid crystal composition may further include a compound represented by Chemical Formula 8:

Chemical Formula 8

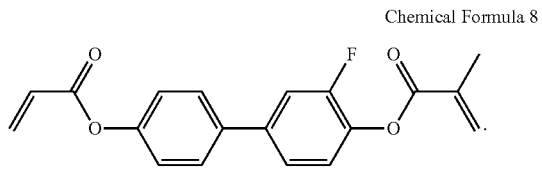 [SMILES: C=CC(=O)Oc1ccc(-c2ccc(OC(=O)C(=C)C)c(F)c2)cc1]

The content of the compound represented by Chemical Formula 8 may be included about 0.2 to about 0.5 parts, by weight, with respect to 100 parts, by weight, of the liquid crystal composition.

The liquid crystal layer may include liquid crystals aligned to have a pre-tilt angle through a polymer network including the polymer of reactive mesogens represented by Chemical Formula 8.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
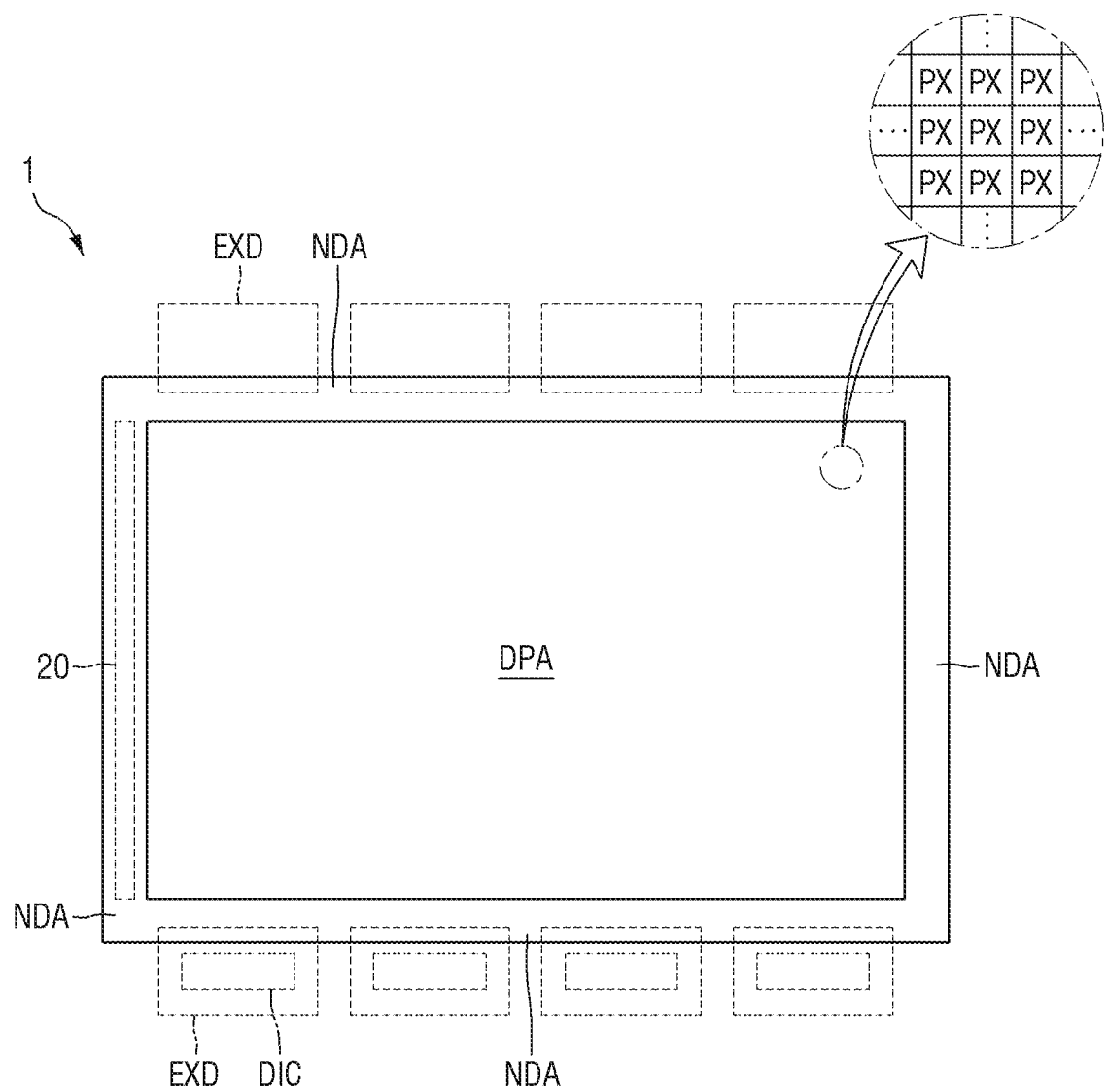
FIG. 1 is a plan view illustrating an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, plates, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, fixed numbers, integers, steps, processes, operations, elements, components, and/or groups thereof, but do not preclude the presence or addition of one or more other features, fixed numbers, integers, steps, processes, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Hereinafter, exemplary embodiments will be described with reference to the accompanying drawings.

FIG. 1 is a plan view illustrating an exemplary embodiment of a display device constructed according to principles of the invention.

Referring to FIG. 1, the display device 1 may be incorporated in or applied to a variety of electronic devices, including smart phones, mobile phones, tablet PCs, personal digital assistants (PDAs), portable multimedia players (PMPs), televisions, game consoles, wrist watch-type electronic devices, head-mounted displays, personal computer monitors, notebook computers, car navigation systems, car dashboards, digital cameras, camcorders, external billboards, electronic signs, medical devices, test devices, various home appliances such as a refrigerator and a washing machine, or IoT devices. As an example of the display device, a television (TV) will be described herein, and the TV may have a high resolution to ultra high resolution such as HD, UHD, 4K, 8K, etc.

In addition, the display device 1 may include a display panel. For example, the display device 1 may be a LCD including a liquid crystal panel. In another exemplary embodiment, the display device 1 may be a display device such as an organic light-emitting diode (OLED) display, an inorganic electroluminescent (inorganic EL) display, a quantum electrodynamics (QED) display, a micro-LED display, nano-LED display, a plasma display panel (PDP), a field emission display (FED) or an electrophoretic display (EPD), which has a liquid crystal panel functioning to control a phase or polarization. For example, the display device 1 may be a stereoscopic image display device in which a liquid crystal panel functions to control polarization. Hereinafter, as an example of the display device, a LCD will be described, and unless special classification is required, the LCD described in the exemplary embodiments herein will be simply abbreviated as a display device. However, the exemplary embodiments are not limited to LCDs, and other display devices listed above or known in the art may be applied within a range sharing the technical idea.

The display device 1 according to some exemplary embodiments may have a generally quadrangular shape, for example, a generally rectangular shape, in a plan view. When the display device 1 is a TV, the long side is positioned in a substantially horizontal direction. However, although not limited, the long side may be disposed in a substantially vertical direction and installed to be rotatable such that the long side may be changeably located in a substantially horizontal or vertical direction.

The display device 1 may include a display area DPA and a non-display area NDA. The display area DPA may be an active area which displays an image. The display area DPA may have a generally rectangular shape in a plan view similar to the overall shape of the display device 1, but the exemplary embodiments are not limited thereto.

The display area DPA may include a plurality of pixels PX. The plurality of pixels PX may be arranged in a matrix direction. The shape of each representative pixel PX may be a generally rectangular or generally square shape in the plan view, but is not limited thereto, or a generally rhombus shape in which each side is inclined with respect to the direction of one side of the display device 1. The plurality of pixels PX may include various color pixels PX. For example, the plurality of pixels PX may include, but are not limited to, a first red pixel PX, a second green pixel PX and a third blue pixel PX. Each color pixel PX may be alternately arranged in an elongated form or a PenTile configuration available from the assignee Samsung Display Co., Ltd, of Yongin-si, Republic of Korea.

The non-display area NDA may be disposed around the display area DPA. The non-display area NDA may surround all or a part of the display area DPA. The display area DPA may have a generally rectangular shape, and the non-display area NDA may be disposed to be adjacent to the four sides of the display area DPA. The non-display area NDA may form a bezel of the display device 1.

In the non-display area NDA, a driving circuit or driving element which drives the display area DPA may be disposed. In one exemplary embodiment, in a first non-display area NDA adjacent to a first long side (the lower side of FIG. 1) and a second non-display area NDA adjacent to a second long side (the upper side of FIG. 1) of the display device 1, pads are provided on a display substrate of the display device 1, and an external device EXD may be mounted on a pad electrode of the pad. Examples of the external device EXD may include a connecting film, a printed circuit board, a driver chip (DIC), a connector, and an interconnection film. In a third non-display area NDA adjacent to a first short side (the left side in FIG. 1) of the display device 1, a gate driver 20 directly formed on the display substrate of the display device 1 may be disposed.

Figure 2:
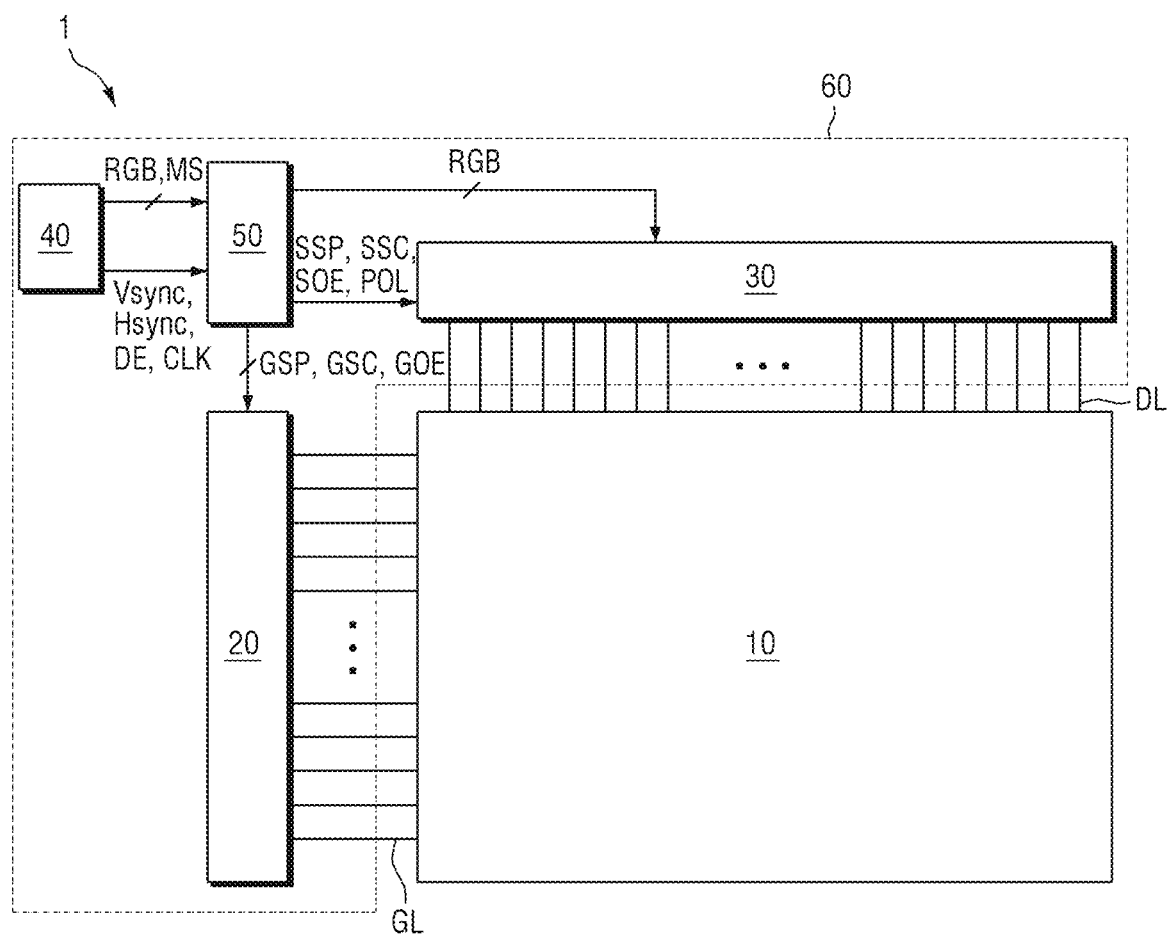
FIG. 2 is a block diagram schematically illustrating the display device of FIG. 1.

FIG. 2 is a block diagram schematically illustrating the display device of FIG. 1.

Referring to FIG. 2, a display device 1 may include a display panel 10 including a liquid crystal layer between two substrates. The display panel 10 may include liquid crystal cells arranged in a matrix form due to the intersecting structure of data lines DL and gate lines GL.

In one exemplary embodiment, the display device 1 may include a driver unit 60 which drives the display panel 10. The driver unit 60 changes a driving mode depending on whether image data RGB input from an external system is a video or still image. For example, when the image data RGB is a video image, the driver unit 60 is driven in a high speed driving mode with a high driving frequency, and when the image data RGB is a still image, the driver unit 60 may be driven in a low speed driving mode with a low frequency. To this end, the driver unit 60 may include a host system 40, a timing controller 50, a data driver 30 and a gate driver 20.

The host system 40 receives image data RGB from an external system, generates a driving mode signal MS corresponding to the image data RGB, and outputs the signal to the timing controller. Specifically, when the image data RGB is a video image, the host system 40 may generate a driving mode signal MS corresponding to a video, and when the image data RGB is a still image, the host system 40 may generate a driving mode signal (MS) corresponding to a still image. A driving mode signal MS may be a signal that allows operation in a high speed mode when the image data RGB corresponds to a video image, whereas when the image data RGB corresponds to a still image, to reduce power consumption, the driving mode signal MS may be a signal that allows operation in a low speed mode.

The timing controller 50 may receive digital video data RGB of an input image from the host system 40, and provide the digital video data RGB of the input image to the data driver 30. In addition, the timing controller 50 may receive the driving mode signal MS from the host system 40. The timing controller 50 may align the digital video data RGB input from the host system 40 to the arrangement of the pixel array, and then provide it to the data driver 30.

The timing controller 50 may receive timing signals such as a vertical synchronization signal Vsync, a horizontal synchronization signal Hsync, a data enable signal DE, a dot clock CLK, etc. from the host system 40 and generate control signals to control the operation timing of the data driver 30 and the gate driver 20. The control signals may include a gate timing control signal for controlling the operation timing of the gate driver 20, and a source timing control signal for controlling the operation timing of the data driver 30.

The gate timing control signal may include a gate start pulse GSP, a gate shift clock GSC and a gate output enable signal GOE. The gate start pulse GSP may be applied to a gate driver integrated circuit (IC) generating a first gate pulse and control the gate driver IC to generate the first gate pulse. The gate shift clock GSC may be a clock signal input to gate driver ICs in common for shifting the gate start pulse GSP. The gate output enable signal GOE may control the output of the gate driver ICs.

The source timing control signal may include a source start pulse SSP, a source sampling clock SSC, a polarity control signal POL and a source output enable signal SOE. The source start pulse SSP may the control data sampling start timing of the data driver 30. The source sampling clock SSC may be a clock signal for controlling the sampling timing of data in the data driver 30 based on a rising or falling edge. The polarity control signal POL may control the polarity of data voltages sequentially output from each of the data driver ICs. The source output enable signal SOE may control the output timing of the data driver 30.

The timing controller 50 may drive an interface by time-division of one frame into n (n is a positive integer of 2 or more) sub-frames and distributed driving of gate lines GL using each sub-frame. The timing controller 50 may group the gate lines GL into n gate groups, and correspond each of the n gate groups to each of the n sub-frames according to a driving order.

The timing controller 50 may control the operation of the gate driver 20 to complete sequential scanning for the gate lines GL included in a corresponding gate group for one sub-frame period of 1/n in each sub-frame, and generate a buffer operation control signal LITEST to block driving power (high-potential driving voltage, base voltage) applied to buffer units of the data driver 30 during a period of (n−1)/n excluding the period of 1/n in the one sub-frame period. That is, the data driver 30 may be controlled to stop driving during a skip period.

The data driver 30 may include a shift register, a latch array, a digital-to-analog converter, and an output circuit. The data driver 30 may latch digital video data RGB according to a source timing control signal, and convert the latched data into an analog positive/negative compensation gamma voltage to provide data voltages whose polarity is reversed at a predetermined period to data lines DL through multiple output channels. The output circuit includes multiple buffer units. The buffer units may be connected to the output channels, and each of the output channels may be connected to each of the data lines DL one-to-one. For example, the data driver 30 may control the polarity of data voltages output to the output channels to reduce power consumption by a column inversion method. According to the column inversion method, the polarity of the data voltage output from the same output channel may be inverted on a sub-frame basis. In addition, the polarity of the data voltages output from adjacent output channels may be opposite to each other.

The gate driver 20 may provide a gate pulse to gate lines GL according to gate timing control signals using a shift register and a level shifter by the above-described interface driving method. The data driver 30 and the gate driver 20 may be mounted by a chip-on-glass (COG) or chip-on-film (COF) method. In addition, the gate driver 20 may be directly formed on a substrate. In one exemplary embodiment, the gate driver 20 is formed on a substrate.

Figure 3:
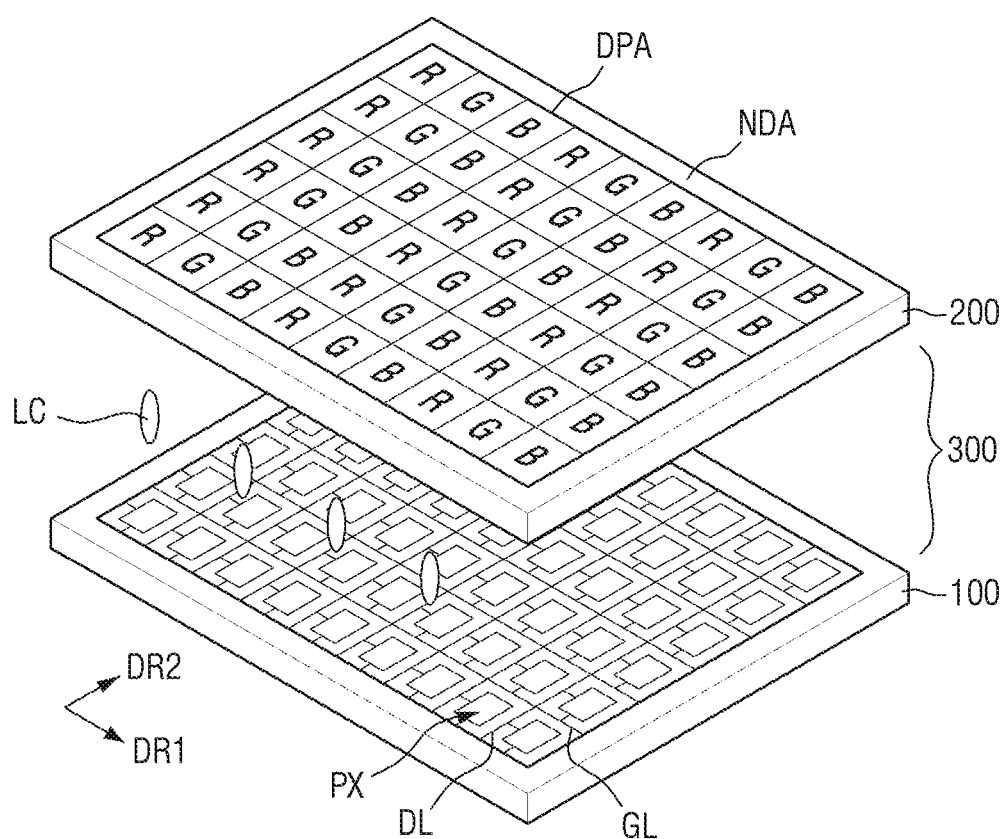
FIG. 3 is a perspective view schematically illustrating an exemplary embodiment of opposed substrates of the display device of FIG. 1.

FIG. 3 is a perspective view schematically illustrating an exemplary embodiment of opposed substrates of the display device of FIG. 1.

Referring to FIG. 3, the display device may include a first substrate 100, a second substrate 200 overlapping the first substrate 100, and a liquid crystal layer 300 interposed between the first substrate 100 and the second substrate 200. The liquid crystal layer 300 may include a plurality of liquid crystals LC, and the liquid crystals LC may have negative dielectric anisotropy.

The display device may include the display area DPA and the non-display area NDA. The display area DPA includes a plurality of pixels PX. Each pixel PX may display one of the basic colors to realize color display. The gate line GL may extend in a first direction DR1 and the data line DL may extend in a second direction DR2 to deliver a gate driving signal and a data driving signal to each of the plurality of pixels PX.

The liquid crystal cells of the pixels PX display an image of video data by adjusting the amount of light transmission according to the electric field difference between a data voltage applied to a pixel electrode and a common voltage applied to a common electrode. The common electrode is formed on a color filter array substrate in vertical electric field driving methods such as a twisted nematic (TN) mode and a vertical alignment (VA) mode, and formed on a first substrate 100, for example, a thin film transistor array substrate along with the pixel electrode in a horizontal electric field driving method such as an in-plane switching (IPS) mode and a plane-to-line switching (PLS) mode.

The first substrate 100 includes data lines DL, gate lines GL, thin film transistors, pixel electrodes connected with the thin film transistors one-to-one, and storage capacitors (Cst) connected with the pixel electrodes one-to-one. On the second substrate 200, a black matrix and a color filter may be disposed. In another exemplary embodiment, a color filter may be disposed on the first substrate 100. On each of the first substrate 100 and the second substrate 200, a polarizing plate may be attached, and an alignment film for setting the pre-tilt angle of liquid crystals may be disposed.

The display device may be embodied in any suitable liquid crystal mode, as well as a TN more, a VA mode, an IPS mode or a PLS mode.

Figure 4:
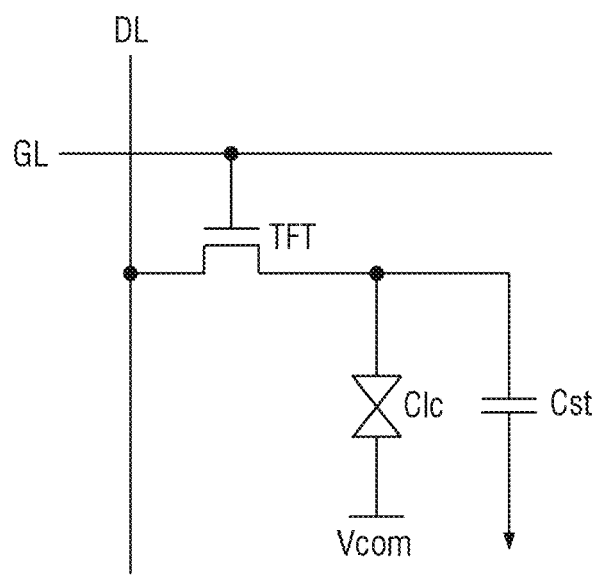
FIG. 4 is a circuit diagram schematically illustrating an exemplary embodiment of a representative pixel equivalent circuit constructed according to principles of the invention.
Figure 5:
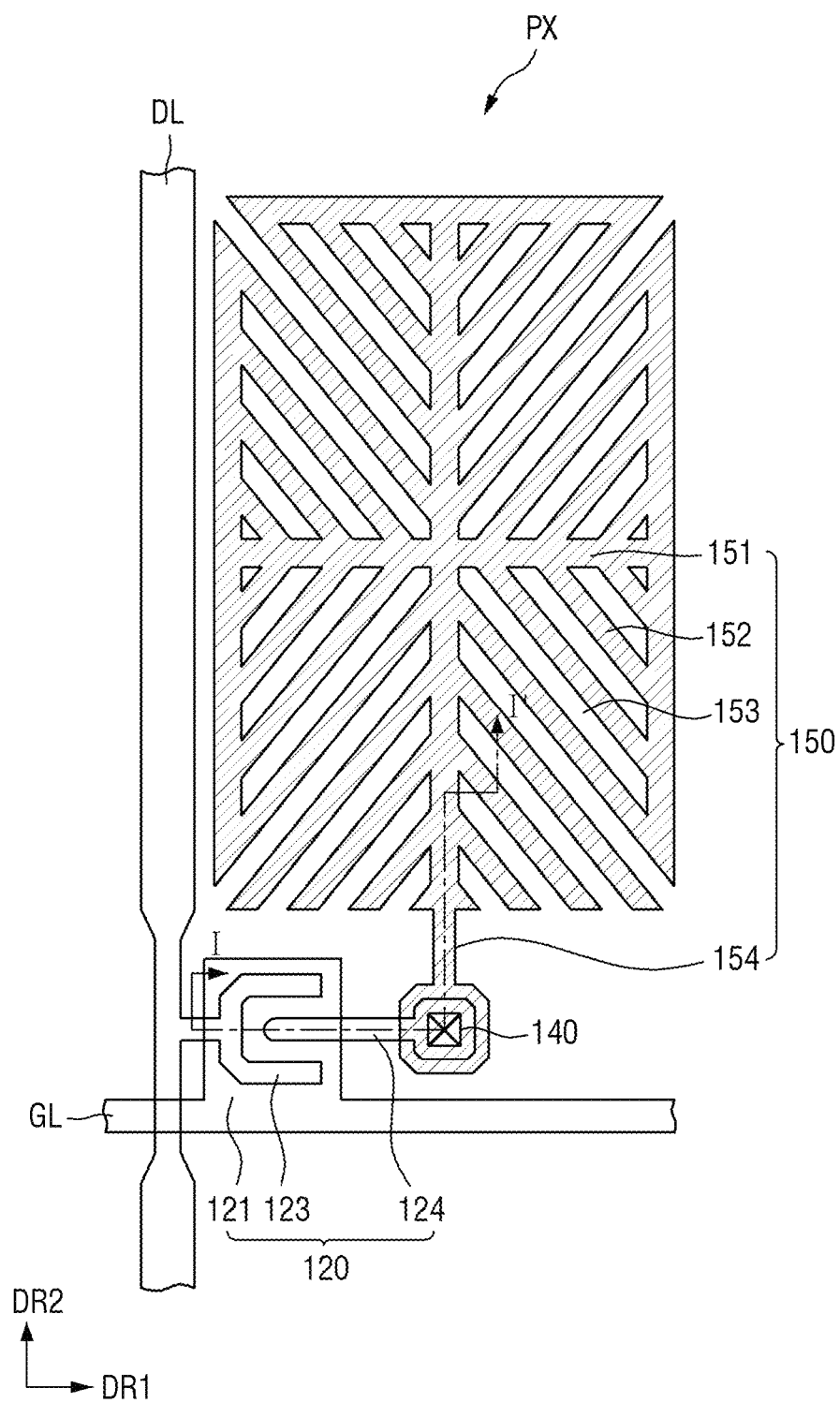
FIG. 5 is a plan view schematically illustrating the planar layout of an exemplary embodiment of a representative pixel constructed according to principles of the invention.
Figure 6:
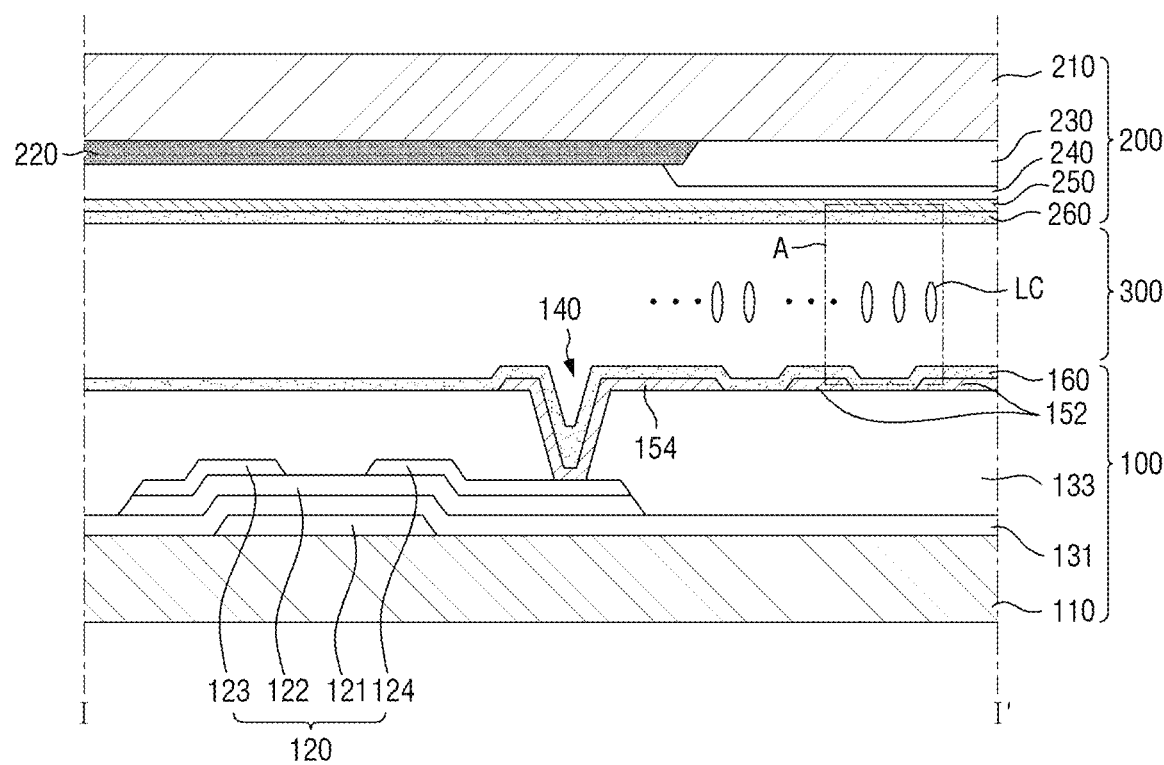
FIG. 6 is a schematic, cross-sectional view taken along line I-I' of FIG. 5 illustrating the structure.
Figure 7:
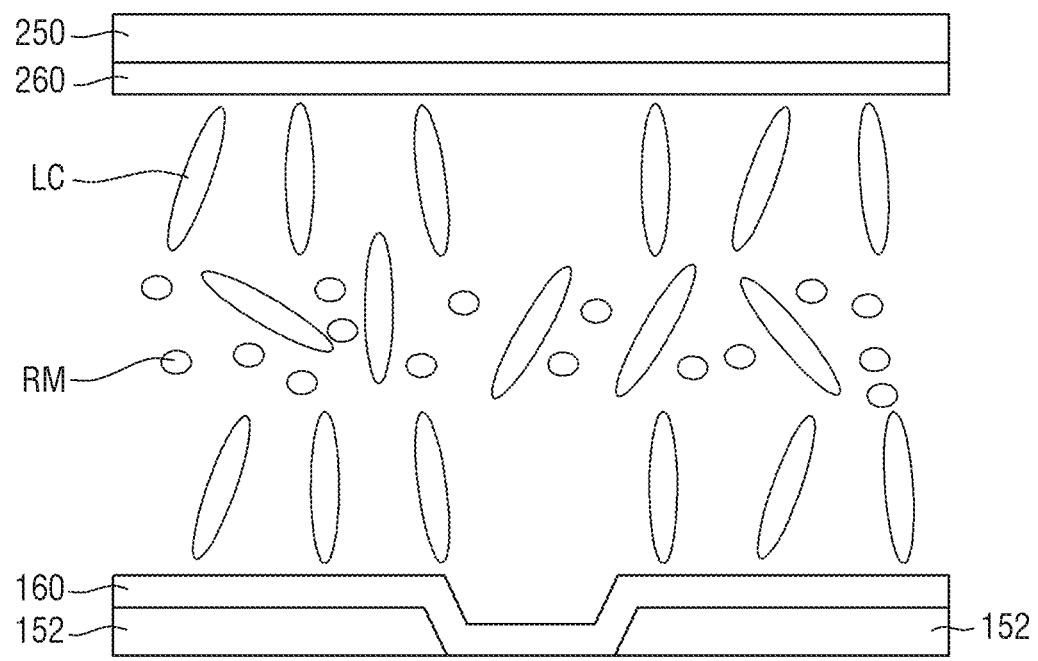
FIGS. 7 to 9 are enlarged cross-sectional views schematically illustrating the region A of FIG. 6.
Figure 8:
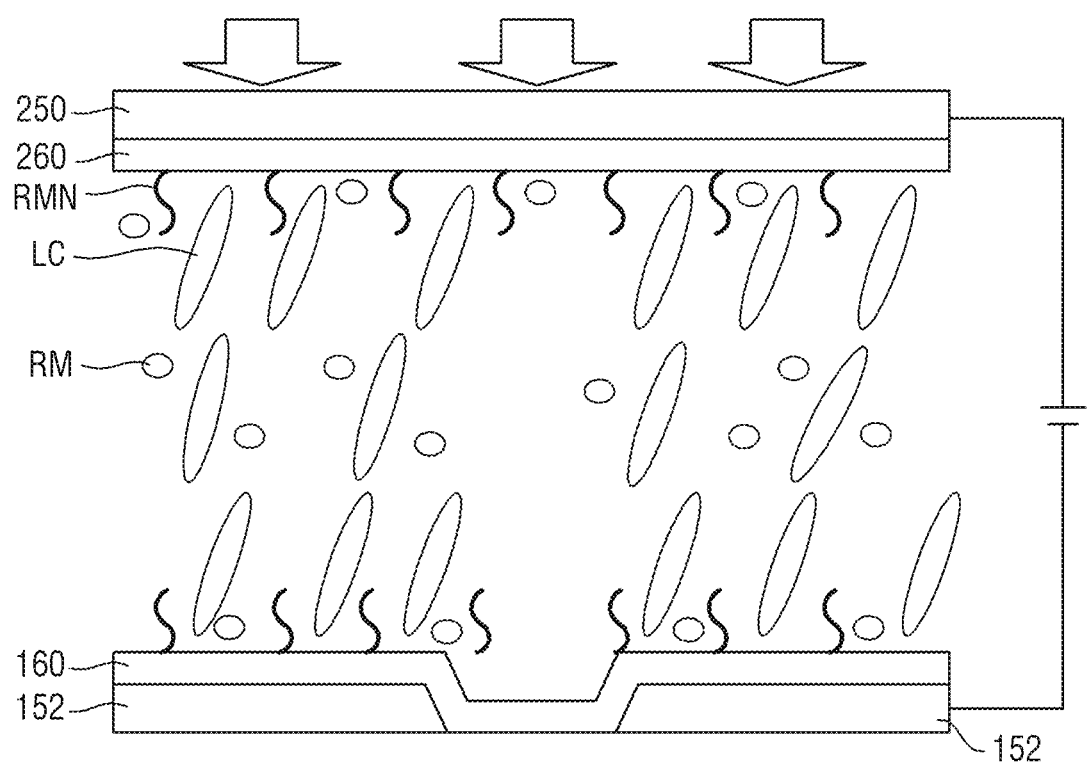
Figure 9:
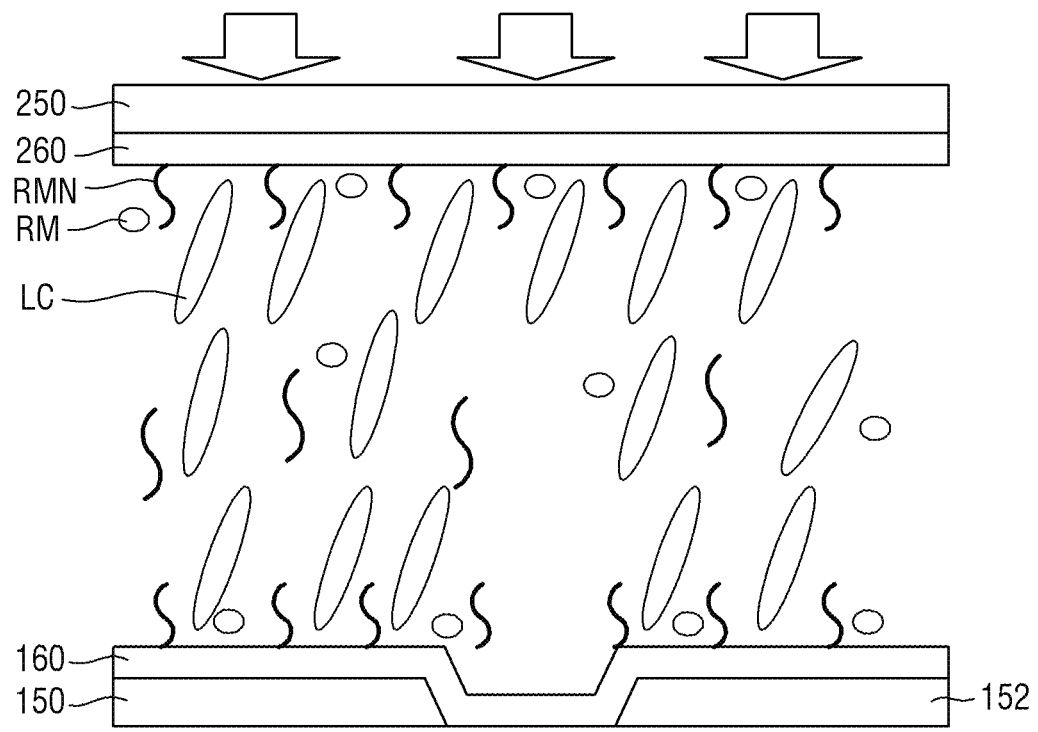

FIG. 4 is a circuit diagram schematically illustrating an exemplary embodiment of a representative pixel equivalent circuit constructed according to principles of the invention. FIG. 5 is a plan view schematically illustrating the planar layout of an exemplary embodiment of a representative pixel constructed according to principles of the invention. FIG. 6 is a schematic, cross-sectional view taken along line I-I' of FIG. 5 illustrating the structure. FIGS. 7 to 9 are enlarged cross-sectional views schematically illustrating the region A of FIG. 6.

Referring to FIG. 4, the display device converts digital video data into an analog data voltage based on a gamma reference voltage and provides the analog data voltage to a data line DL and also provides a scan pulse to a gate line GL, thereby charging a liquid crystal cell Clc with the data voltage. To this end, the gate electrode of a thin film transistor TFT is connected to the gate line GL, a source electrode is connected to the data line DL, and a drain electrode of the thin film transistor TFT is connected to a pixel electrode of the liquid crystal cell Clc and one electrode of the storage capacitor Cst.

A common voltage Vcom is provided to a common electrode of the liquid crystal cell Clc. The storage capacitor Cst charges the data voltage applied from the data line DL when the thin film transistor is turned on to constantly maintain the voltage of the liquid crystal cell Clc. When a scan pulse is applied to the gate line GL, the thin film transistor is turned on to form a channel between the source electrode and the drain electrode, thereby providing the voltage on the data line DL to the pixel electrode of the liquid crystal cell Clc. Here, as the arrangement of liquid crystal molecules of the liquid crystal cell Clc is changed due to the electric field between the pixel electrode and the common electrode, incident light is changed. Although not wanting to be bound by theory, the display device may be operated according to this principle.

Specifically, referring to FIGS. 5 and 6, the first substrate 100 is a substrate on which a switching device 120 for controlling the alignment direction of liquid crystals LC in the liquid crystal layer 300 is disposed, and the second substrate 200 may be a counter substrate for sealing the liquid crystal layer 300 with the first substrate 100.

The first substrate 100 may include a first insulation substrate 110, a switching device 120 disposed on the first insulation substrate 110, and a pixel electrode 150 disposed on the switching device 120.

The first insulation substrate 110 may be a transparent insulation substrate. For example, the first insulation substrate 110 may be a glass or plastic substrate. In addition, the first insulation substrate 110 may be flexible.

The switching device 120 may be disposed on the first insulation substrate 110. The switching device 120 may be a thin film transistor, which includes a gate electrode 121 disposed on the first insulation substrate 110, a semiconductor layer 122 disposed on the gate electrode 121, and a source electrode 123 and a drain electrode 124, which are spaced apart from each other on the semiconductor layer 122.

The gate electrode 121 is connected with a gate line GL to deliver a gate driving signal. The gate electrode 121 is formed of any one of molybdenum (Mo), aluminum (Al), chromium (Cr), gold (Au), titanium (Ti), nickel (Ni), neodymium (Nd) and copper (Cu) or an alloy thereof. In addition, the gate electrode 121 may be a multilayer consisting of any one selected from the group consisting of molybdenum (Mo), aluminum (Al), chromium (Cr), gold (Au), titanium (Ti), nickel (Ni), neodymium (Nd) and copper (Cu) or an alloy thereof. For example, the gate electrode 121 may be a molybdenum/aluminum-neodymium or molybdenum/aluminum bilayer.

A gate insulating layer 131 for insulating the gate electrode 121 may be disposed on the gate electrode 121. The gate insulating layer 131 may consist of silicon oxide ($SiO_x$), silicon nitride (SiN) or silicon oxynitride ($SiO_xN_y$), and may be a monolayer or a multilayer thereof.

The semiconductor layer 122 may be disposed on the gate insulating layer 131. The semiconductor layer 122 on the gate insulating layer 131 may overlap the gate electrode 121. The semiconductor layer 122 may consist of a silicon semiconductor or an oxide semiconductor. The silicon semiconductor may include an amorphous silicon or a crystallized polycrystalline silicon. Because the polycrystalline silicon may have high mobility (100 $cm^2$/Vs or more), low energy power consumption and excellent reliability, and because the oxide semiconductor has low off-current, the oxide semiconductor may be selectively used as needed.

The source electrode 123 and the drain electrode 124 spaced apart from each other may be disposed on the semiconductor layer 122. The source electrode 123 may be connected with a data line DL to deliver a data driving signal, and the drain electrode 124 may be electrically connected with a pixel electrode 150.

The source electrode 123 and the drain electrode 124 may be formed of a monolayer or multilayer. When the source electrode 123 and the drain electrode 124 are monolayers, they may be formed of any one selected from the group consisting of molybdenum (Mo), aluminum (Al), chromium (Cr), gold (Au), titanium (Ti), nickel (Ni), neodymium (Nd) and copper (Cu) or an alloy thereof. In addition, when the source electrode 123 and the drain electrode 124 are multilayers, they may be formed of a copper/titanium or molybdenum/aluminum-neodymium bilayer, or a titanium/aluminum/titanium, molybdenum/aluminum/molybdenum or molybdenum/aluminum-neodymium/molybdenum triple layer.

A protective layer 133 for protecting the switching device 120 may be disposed on the above-described switching device 120. The protective layer 133 may be formed of an inorganic material, an organic material or a mixture thereof. When the protective layer 133 is formed of an inorganic material, it may be formed as a monolayer of silicon oxide ($SiO_x$), silicon nitride ($SiN_x$) or silicon oxynitride ($SiO_xN_y$) or a multilayer thereof. When the protective layer 133 is formed of an organic material, the organic material may be a polyimide, a benzocyclobutene series resin, or an acrylate series resin. When the protective layer 133 is formed of a mixture of an inorganic material and an organic material, the organic material may be disposed on the inorganic material to flatten a lower step.

The pixel electrode 150 may be disposed on the protective layer 133. The pixel electrode 150 may be connected to the drain electrode 124 through a contact hole 140 and controlled by a data driving signal.

The pixel electrode 150 may include a first stem 151, a plurality of branches 152 extending outward from the stem 151 and spaced apart from each other with a slit 153 therebetween, and an extended portion 154 that is extended to the switching device 120.

The stem 151 may include a substantially horizontal stem extending in a first direction DR1 and a substantially vertical stem extending in a second direction DR2. The stem 151 may divide the pixel electrode 150 into subregions, that is, domains. The stem 151 may be formed in, for example, a generally cross-shape. In this case, the pixel electrode 150 may be divided into four subregions by the stem 151. The branches 152 located in respective subregions may extend in different directions. For example, as shown in FIG. 2, the branches 152 located in the upper right subregion may obliquely extend in an upper right direction from the stem 151, and the branches 152 located in the lower right subregion may obliquely extend in a lower right direction from the stem 151. In addition, the branches 152 located in the upper left subregion may obliquely extend in the upper left direction from the stem 151, and the branches 152 located in the lower left subregion may obliquely extend in a lower left direction from the stem 151. The extended portion 154 may extend to the switching device 120 from the stem 151 or branches 152, and connected with the drain electrode 124 through the contact hole 140.

The pixel electrode 150 may include a transparent conductive material through which light may pass. The pixel electrode 150 may be, but is not limited to, formed of an indium tin oxide (ITO), an indium zinc oxide (IZO) or an indium tin zinc oxide (ITZO), and any transparent and conductive material may be used.

A first alignment layer 160 may be disposed on the pixel electrode 150. The first alignment layer 160 may include a vertical alignment group, and induce the initial substantially vertical alignment of liquid crystals LC in the liquid crystal layer 300 using the vertical alignment group. The first alignment layer 160 may include polyamic acid or polyimide.

The second substrate 200 may include a second insulation substrate 210, a light blocking member 220 disposed on the second insulation substrate 210, a color filter 230, and a common electrode 250 disposed on the light blocking member 220 and the color filter 230.

The second insulation substrate 210 may be a transparent insulation substrate such as the first insulation substrate 110. The light blocking member 220 may be formed of a material that absorbs or reflects light in an at least specific wavelength range to block light transmission. For example, the light blocking member 220 may be a black matrix. The light blocking member 220 may be disposed at the boundary between adjacent pixels to prevent a color mixing defect.

The color filter 230 may include a material that absorbs a specific wavelength band of transmitted light, or shifts or converts the wavelength of transmitted light to a specific wavelength. That is, the color filter 230 may selectively transmit only light in a specific wavelength band. FIG. 6 shows that the light blocking member 220 and the color filter 230 may be disposed on the second substrate 200, but one or more of the light blocking member 220 and the color filter 230 may be disposed on the first substrate 100.

An overcoat layer 240 may be disposed on the light blocking member 220 and the color filter 230. The overcoat layer 240 may include an organic material. The overcoat layer 240 may flatten a step caused by components stacked on the second substrate 210.

The common electrode 250 may be disposed on the overcoat layer 240. The common electrode 250 may be disposed on the plurality of pixels, and a common voltage may be applied thereto. The common electrode 250 may form a vertical electric field in the liquid crystal layer 300 along with the pixel electrode 150. The common electrode 250 may form an electric field in the liquid crystal layer 300 along with the pixel electrode 150 to control an alignment direction of liquid crystals LC. FIG. 6 shows that the pixel electrode 150 is disposed on the first substrate 100, and the common electrode 250 is disposed on the second substrate 200, but the pixel electrode 150 and the common electrode 250 may be disposed on the same substrate.

A second alignment layer 260 may be disposed on the common electrode 250. The second alignment layer 260 is formed the same as the first alignment layer 160, and thus duplicated description will be omitted to avoid redundancy.

The liquid crystal layer 300 may be disposed between the first substrate 100 and the second substrate 200. The liquid crystal layer 300 may include a plurality of liquid crystals LC. A liquid crystal composition constituting the liquid crystal layer 300 may have negative dielectric anisotropy. As the major axes of the liquid crystals LC are aligned in a direction approximately vertical to the alignment surface in an initial alignment state, the liquid crystals LC may remain stabilized. In addition, the liquid crystals LC may have a predetermined pre-tilt angle and remain stabilized.

The liquid crystals LC having negative dielectric anisotropy may be inclined such that the major axes form a predetermined angle based on the electric field direction by the vertical electric field formed by the pixel electrode 150 and the common electrode 250. As the direction of the major axis of the liquid crystal LC is changed, a phase difference delay value changes, and therefore, the amount of light passing through the liquid crystal layer 300 may be adjusted. In one exemplary embodiment, the initial alignment state refers to the alignment state of liquid crystals LC in a state in which the electric field is not formed in the liquid crystal layer 300.

Referring to FIGS. 7 to 9, in the display device, the liquid crystal layer 300 is subjected to polymer stabilized-vertical alignment (PS-VA). The PS-VA liquid crystal layer 300 may be stabilized as liquid crystals LC are aligned to have a pre-tilt angle by a polymer network including, or in some exemplary embodiments, consisting of polymers of reactive mesogens RM.

The liquid crystal layer 300 may include liquid crystals LC and reactive mesogens RM. The reactive mesogens RM may form a polymer network consisting of a polymer of reactive mesogens RM through a UV exposure process.

Specifically, as shown in FIG. 7, in the liquid crystal layer 300, the liquid crystals LC and the reactive mesogens RM may be randomly arranged in an initial state.

As shown in FIG. 8, when electric field is formed in the liquid crystal layer 300, the liquid crystals LC may be inclined in a direction substantially parallel to the lengthwise direction of the branches (152 of FIG. 5) of the pixel electrode (150 of FIG. 5) in response to the electric field. In FIG. 5, as the pixel electrode 150 is formed to have four domains, the directions of inclination of the liquid crystals LC in one pixel may be a total of four directions. When UV is irradiated while the electric field is applied to the liquid crystal layer 300, a polymer network RMN consisting of polymers in contact with the above-described first alignment layer 160 and second alignment layer 260 is formed by polymerization of reactive mesogens RM. An initial alignment direction (pre-tilt direction) is determined such that liquid crystals LC are pre-tilted in the above-described direction by the polymer network RMN.

As shown in FIG. 9, to finally exhaust unreacted remaining reactive mesogens RM in the liquid crystal layer 300, the liquid crystal layer 300 may be produced by irradiating fluorescent UV.

The above-described liquid crystal layer 300 may improve the response speed of the liquid crystals LC using the reactive mesogens RM. In one exemplary embodiment, the liquid crystal composition which is able to further improve the response speed of the liquid crystals LC will be described below.

The liquid crystal composition constituting the liquid crystal layer 300 according to one exemplary embodiment may include a neutral compound and a polar compound including at least one fluorine atom.

The neutral compound may include compounds represented by Chemical Formulas 1 to 3 below:

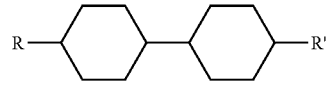

Chemical Formula 1

Chemical Formula 2

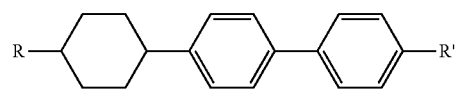

Chemical Formula 3

In Chemical Formulas 1 to 3, R and R' may each be independently an alkyl or alkenyl group having 1 to 7 carbon atoms.

Specifically, in each of Chemical Formulas 1 to 3, the alkyl or alkenyl group may be included. When both R and R' are alkyl groups or alkenyl groups, the alkyl or alkenyl groups may be the same or different from each other. The alkyl or alkenyl group may individually have the same or different carbon numbers.

The compound represented by Chemical Formula 1 may be included in a range of about 20 to about 60 parts, by weight, with respect to 100 parts, by weight, of the liquid crystal composition. When the compound represented by Chemical Formula 1 is included in a range of about 20 to about 60 parts, by weight, with respect to 100 parts by weight of the liquid crystal composition, the stability of the liquid crystals may be improved.

Particularly, the compound represented by Chemical Formula 1 may include at least two types of compounds. Specifically, the compound represented by Chemical Formula 1 may include a first compound in which at least one of R and R' has an alkyl group, and a second compound in which at least one of R and R' has an alkenyl group. In the first compound, R and R' may be an alkyl group, and in the second compound, R may be one selected from alkyl and alkenyl groups and R' may be the other one. In one exemplary embodiment, in the first compound, R and R' may be non-polar, and may be an alkyl group. In the second compound, R (or R') may be an alkyl group, and R' (or R) may be an alkenyl group.

The first compound may be a neutral compound, and the second compound may be a low viscosity compound. In this case, the second compound may be included in a range of about 18 to about 36 parts, by weight, with respect to 100 parts by weight of the compound represented by Chemical Formula 1, and the first compound may be contained at the remaining parts by weight. When the second compound is included in a range of about 18 to about 36 parts, by weight, with respect to the compound represented by Chemical Formula 1, the viscosity of the liquid crystal composition may be suitably adjusted.

The compound represented by Chemical Formula 2 may be included in a range of about 5 to about 18 parts, by weight, with respect to 100 parts, by weight, of the liquid crystal composition. When the compound represented by Chemical Formula 2 is included in a range of about 5 to about 8 parts, by weight, with respect to 100 parts, by weight, of the liquid crystal composition, the refractive index anisotropy (Δn), nematic phase-isotropic transition temperature (Tni), rotational viscosity (γ1) and elastic moduli (K11, K33) may be improved.

The compound represented by Chemical Formula 3 may be included in a range of about 5 to about 18 parts, by weight, with respect to 100 parts, by weight, of the liquid crystal composition. When the compound represented by Chemical Formula 3 is included in a range of about 5 to about 18 parts, by weight, with respect to 100 parts, by weight, of the liquid crystal composition, the refractive index anisotropy (Δn), nematic phase-isotropic transition temperature (Tni), rotational viscosity (γ1) and elastic moduli (K11, K33) may be improved.

The above-described compounds represented by Chemical Formulas 1 to 3 are neutral compounds, and may individually improve the stability of liquid crystals.

The polar compound may include one or more compounds represented by Chemical Formulas 4 to 7:

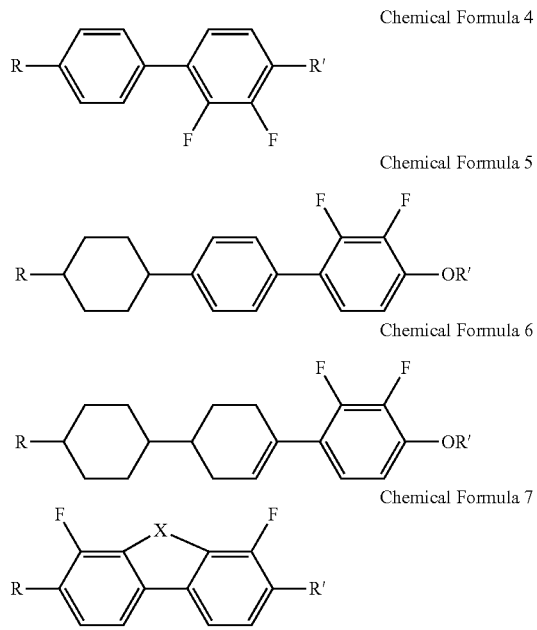

In Chemical Formulas 4 to 7, R and R' may each be independently an alkyl or alkenyl group having 1 to 7 carbon atoms. In Chemical Formula 7, X may be S or specifically, each of Chemical Formulas 4 to 7 may include an alkyl or alkenyl group. When both R and R' are an alkyl or alkenyl group, the alkyl or alkenyl group may be the same or different from each other. The alkyl or alkenyl group may individually have the same or different carbon numbers.

The compound represented by Chemical Formula 4 may be included in a range of about 5 to about 35 parts, by weight, with respect to 100 parts, by weight, of the liquid crystal composition. When the compound represented by Chemical Formula 4 is included in a range of about 5 to about 35 parts, by weight, with respect to 100 parts, by weight, of the liquid crystal composition, the refractive index anisotropy (Δn), elastic moduli (K11, K33) and permittivity may be improved.

The compound represented by Chemical Formula 5 may be included in a range of about 1 to about 8 parts, by weight, with respect to 100 parts, by weight, of the liquid crystal composition. When the compound represented by Chemical Formula 5 is included in a range of about 1 to about 8 parts, by weight, with respect to 100 parts, by weight, of the liquid crystal composition, the refractive index anisotropy (Δn), nematic phase-isotropic transition temperature (Tni), rotational viscosity (γ1) and elastic moduli (K11, K33) may be improved.

The compound represented by Chemical Formula 6 may be included in a range of about 1 to about 8 parts, by weight, with respect to 100 parts, by weight, of the liquid crystal composition. When the compound represented by Chemical Formula 6 is included in a range of about 1 to about 8 parts, by weight, with respect to 100 parts, by weight, of the liquid crystal composition, the refractive index anisotropy (Δn) and elastic moduli (K11, K33) may be improved, and viscosity may be reduced.

The compound represented by Chemical Formula 7 may be included in a range of about 1 to about 15 parts, by weight, with respect to 100 parts, by weight, of the liquid crystal composition. When the compound represented by Chemical Formula 7 is included in a range of about 1 to about 15 parts, by weight, with respect to 100 parts, by weight, of the liquid crystal composition, the refractive index anisotropy (Δn), permittivity, nematic phase-isotropic transition temperature (Tni), rotational viscosity (γ1) and elastic moduli (K11, K33) may be improved.

The above-described compounds represented by Chemical Formulas 4 to 7 are polar compounds, and may individually improve the refractive index anisotropy (Δn) and elastic moduli (K11, K33) of the liquid crystals.

The liquid crystal composition according to one exemplary embodiment may further include the compound represented by Chemical Formula 8:

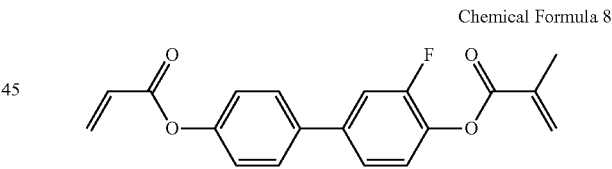

The compound represented by Chemical Formula 8 may be a type of reactive mesogen, and may include a methacrylate having many reaction sites. The compound represented by Chemical Formula 8 may be included in a range of about 0.2 to about 0.5 parts, by weight, with respect to 100 parts, by weight, of the liquid crystal composition. The compound represented by Chemical Formula 8 may form a polymer network including or consisting of a polymer network consisting of polymers through a UV irradiation process. The compound represented by Chemical Formula 8 may or may not form a polymer network, and remain in the liquid crystal layer 300.

The liquid crystal composition according to one exemplary embodiment may include each of the above-described compounds represented by Chemical Formulas 1 to 7. Particularly, the liquid crystal composition may include in a range of about 20 to about 60 parts, by weight, of the compound represented by Chemical Formula 1, in a range of about 5 to about 18 parts, by weight, of the compound represented by Chemical Formula 2, in a range of about 5 to about 18 parts, by weight, of the compound represented by Chemical Formula 3, in a range of about 5 to about 35 parts, by weight, of the compound represented by Chemical Formula 4, in a range of about 1 to about 8 parts, by weight, of the compound represented by Chemical Formula 5, in a range of about 1 to about 8 parts, by weight, of the compound represented by Chemical Formula 6, and in a range of about 1 to about 15 parts, by weight, of the compound represented by Chemical Formula 7.

As the above-described liquid crystal composition according to one exemplary embodiment may include the compound of Chemical Formula 7 exhibiting relatively high polarity, it may have a low rotational viscosity (γ1) of 81 milliPascal per second (mPa.$) or less. In addition, the liquid crystal composition may include the compounds of Chemical Formulas 2, 3, 5 and 6 with three rings, thereby ensuring an elastic modulus (K33) without an increase in viscosity. In one example, the liquid crystal composition may have an elastic modulus (K33) in a range of about 13 to about 17 pN. In addition, the liquid crystal composition may allow a cell gap (d) of a liquid crystal panel to have a cell gap (d) in a range of about 2.0 to about 2.6 pin in order to improve yield and reduce transmittance.

The liquid crystal composition according to one exemplary embodiment may improve response speed by relatively reducing the cell gap (d) as the refractive index anisotropy (Δn) increases. The liquid crystal composition according to one exemplary embodiment may have a refractive index anisotropy (Δn) in a range of about 0.097 to about 0.137, and a dielectric anisotropy (Δε) in a range of about −3.2 to about −2.2. In addition, the liquid crystal composition may have an elastic modulus (K33) in a range of about 13 to about 17 pN. The liquid crystal composition may be adjusted so that the refractive index anisotropy (Δn) has a certain value in accordance with the cell gap (d), or adjusted so that the cell gap (d) has a certain value in accordance with the refractive index anisotropy (Δn) within a phase difference range of the liquid crystal panel. In one exemplary embodiment, the phase difference of the liquid crystal panel may be adjusted to be in a range of about 285 to about 325 nm.

As the liquid crystal composition has a high refractive index anisotropy (Δn) and a low dielectric anisotropy (Δε), the cell gap (d) of the liquid crystal panel may be reduced. Accordingly, the response speed of the liquid crystal of the liquid crystal panel may be improved.

Hereinafter, the transmittance characteristics of the display device including the liquid crystal composition according to the above-described embodiment will be examined. The display device shown in FIGS. 5 and 6 was manufactured, and an example of the liquid crystal composition is to be described below.

EXAMPLE

The above-described display device shown in FIGS. 5 and 6 was manufactured using a liquid crystal composition in Table 1 below, and a 27-inch QHD display device was manufactured.

TABLE 1

| Compound | Content (parts by weight) |
|---|---|
| 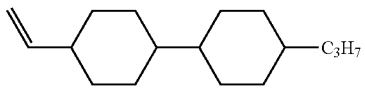 | 28.5 |
| 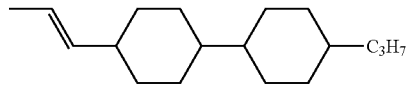 | 9.0 |
| 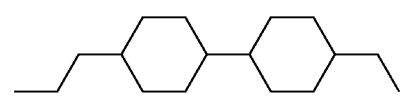 [SMILES: CCCC1CCC(C2CCC(CC)CC2)CC1] | |
| 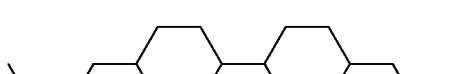 | |
| 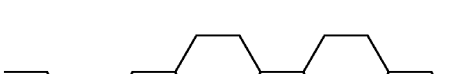 | |
| 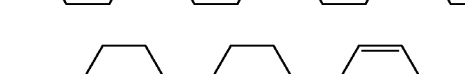 | 11.5 |
| 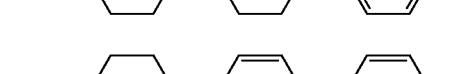 | 11.0 |
| 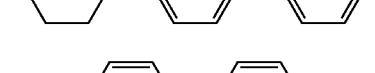 | 20.5 |
| 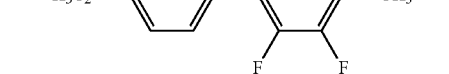 | 5.0 |
| 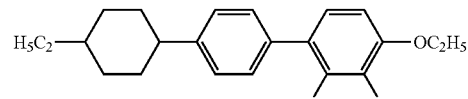 | 5.5 |
| 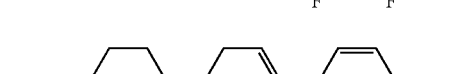 | 9.0 |

The nematic phase-isotropic transition temperature (Tni), refractive index anisotropy (Δn), dielectric anisotropy (Δε), rotational viscosity (γ1) and elastic moduli (K11, K33) of the liquid crystal composition prepared according to the above-described embodiment were measured, and are shown in Table 2 below.

TABLE 2

|  | Example |
| --- | --- |
| Nematic phase-isotropic transition temperature (Tni) | 74 |
| Refractive index anisotropy (Δn) | 0.117 |
| Dielectric anisotropy (Δε) | −2.7 |
| Rotational viscosity (γ1) | 75 |
| Elastic modulus (K11) | 14 |
| Elastic modulus (K33) | 15 |

Referring to Table 2, the liquid crystal composition of the example had a nematic phase-isotropic transition temperature (Tni) of 74° C., a refractive index anisotropy (Δn) of 0.117, a dielectric anisotropy (Δε) of −2.7, a rotational viscosity (γ1) of 75, an elastic modulus (K11) of 14, and an elastic modulus (K33) of 15.

The transmittance and the average response speed for all grayscales of the display device of the above-described example were measured, and are shown in Table 3 below. Here, the cell gap (d) of the display device was 2.6 μM.

TABLE 3

|  |  | Example |
| --- | --- | --- |
| Transmittance (%) |  | 3.1 |
| Average response rate for all grayscales | Overdrive ON | 1.8 ms |
|  | Overdrive OFF | 5.6 ms |

Referring to Table 3, the display device of the example had a transmittance of 3.1%, and an average response speed for all grayscales during over drive was 1.8 milliseconds (ms).

In this example, after the same image was displayed on each of the display device of the above-described example, which has an average response speed for all grayscales of 1.8 ms, and a display device having an average response speed for all grayscales of 4.6 ms as a comparative example, whether an afterimage was generated after the image was scrolled from left to right was observed.

Figure 10:
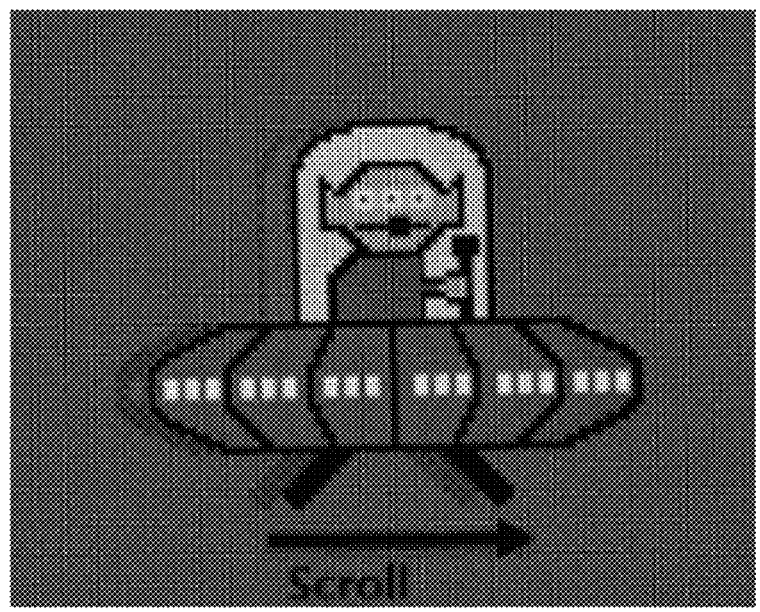
FIG. 10 depicts an exemplary embodiment of an image displayed on a display device constructed according to the principles of the invention when an average response speed for all grayscales is 1.8 ms.
Figure 11:
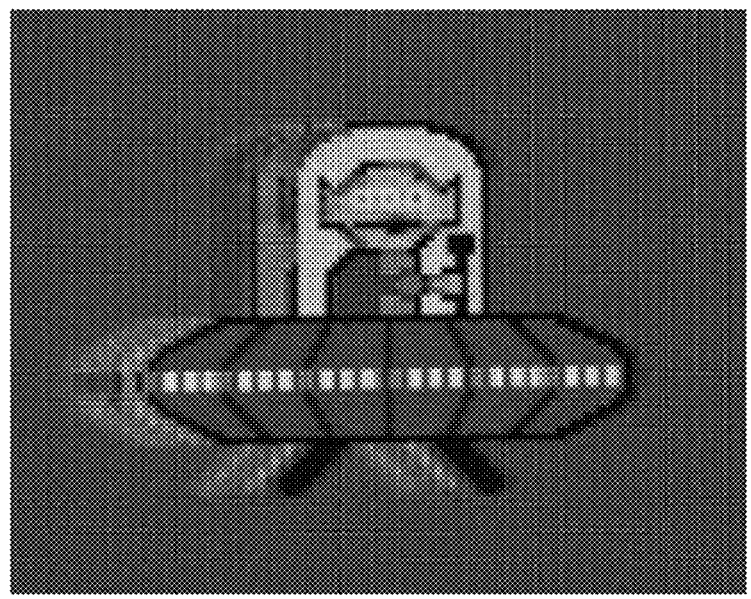
FIG. 11 depicts a comparative embodiment of an image displayed on a display device when an average response speed for all grayscales is 4.6 ms.

FIG. 10 depicts an exemplary embodiment of an image displayed on a display device constructed according to the principles of the invention when an average response speed for all grayscales is 1.8 ms. FIG. 11 depicts a comparative embodiment of an image displayed on a display device when an average response speed for all grayscales is 4.6 ms.

Referring to FIGS. 10 and 11, compared with the display device of the comparative example, it was able to be confirmed that the display device of the example was relatively improved in afterimage during image scrolling. In this example, a tool measured an average of response speed data of the display device manufactured of the above-described example having an average response speed for all grayscales of 1.8 ms and the tool measured an average of response speed data of the display device having an average response speed for all grayscales of 4.6 ms as a comparative example, a response time when driven ($T_{on}$) or turned off ($T_{off}$) was measured for all grayscales.

Figure 12:
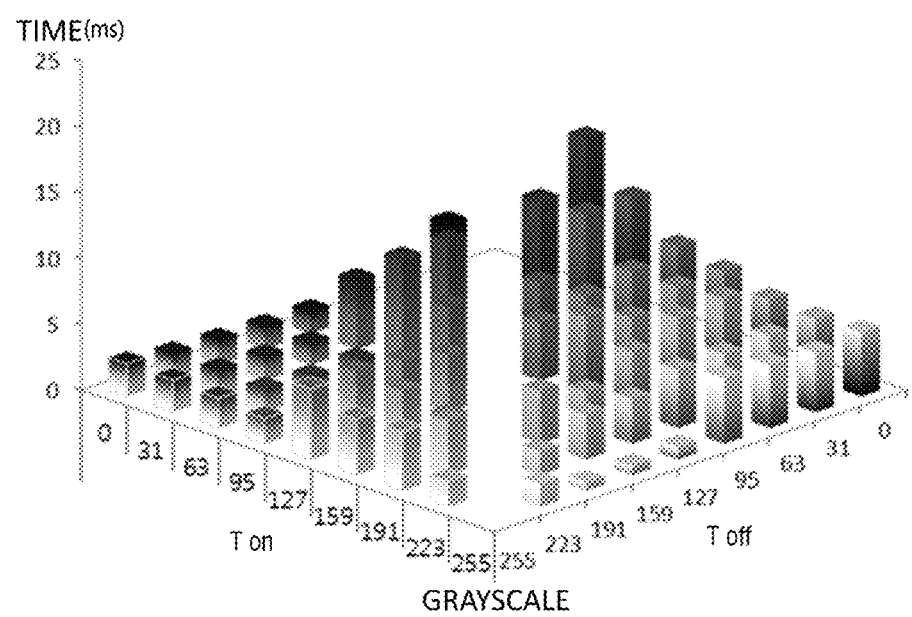
FIG. 12 is a graphical depiction showing response speeds for all grayscales of an exemplary embodiment of a display device constructed according to principles of the invention.
Figure 13:
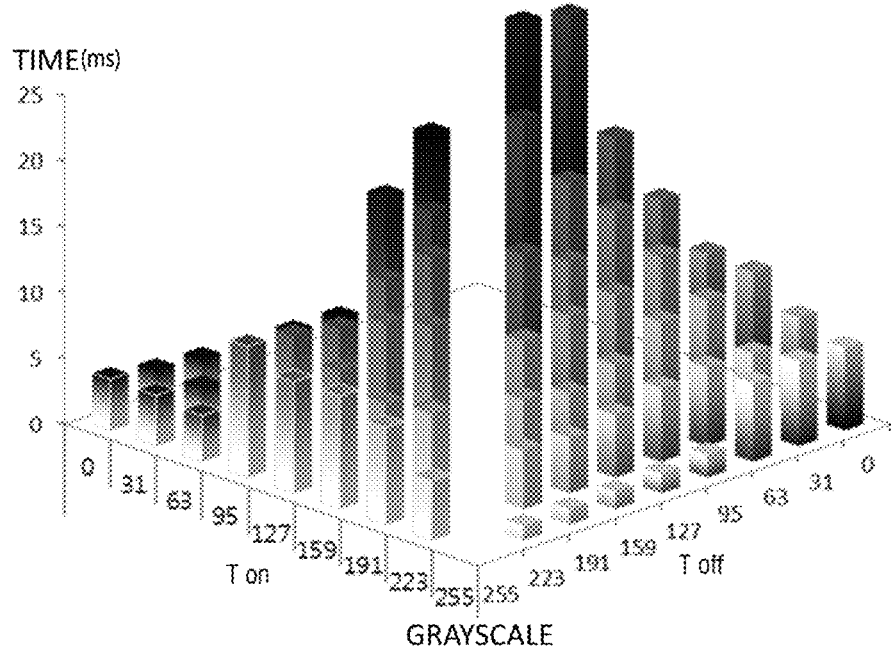
FIG. 13 is a graphical depiction showing response speeds for all grayscales of a comparative embodiment of a display device.

FIG. 12 is a graphical depiction showing response speeds for all grayscales of an exemplary embodiment of a display device constructed according to principles of the invention. FIG. 13 is a graphical depiction showing response speeds for all grayscales of a comparative embodiment of a display device.

Referring to FIGS. 12 and 13, it was confirmed that the display device of the example has a significantly higher response speed for all grayscales, compared with the comparative example.

As described above, the liquid crystal composition of the example may have increased refractive index anisotropy (Δn) and decreased dielectric anisotropy (AO. The display device including the liquid crystal composition of the example may improve the response speed of liquid crystals by reducing the cell gap of the liquid crystal panel.

According to a liquid crystal composition according to one exemplary embodiment, the refractive index anisotropy (Δn) of a liquid crystal composition can increase and the dielectric anisotropy (Δε) thereof can decrease. Therefore, a display device including the liquid crystal composition according to one exemplary embodiment can lower a cell gap of liquid crystal panels, thereby improving the response speed of a liquid crystal.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A liquid crystal composition for a display device, the composition comprising:

about 20 to about 60 parts, by weight, of at least one compound represented by Chemical Formula 1;

Chemical Formula 1

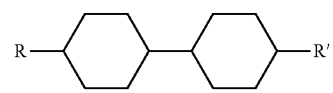

about 5 to about 18 parts, by weight, of at least one compound represented by Chemical Formula 2;

Chemical Formula 2

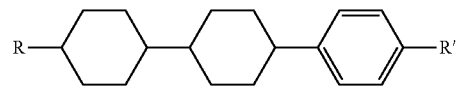

about 5 to about 18 parts, by weight, of at least one compound represented by Chemical Formula 3;

Chemical Formula 3

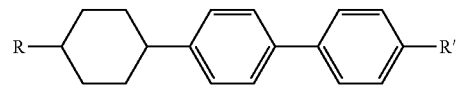

about 5 to about 35 parts, by weight, of at least one compound represented by Chemical Formula 4;

Chemical Formula 4

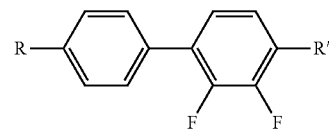

about 1 to about 8 parts, by weight, of a compound represented by Chemical Formula 5;

Chemical Formula 5

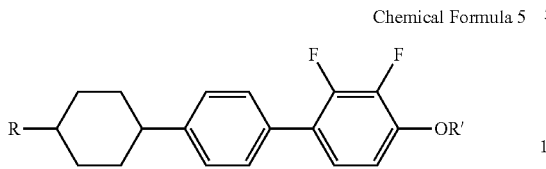

about 1 to about 8 parts, by weight, of a compound represented by Chemical Formula 6;

Chemical Formula 6

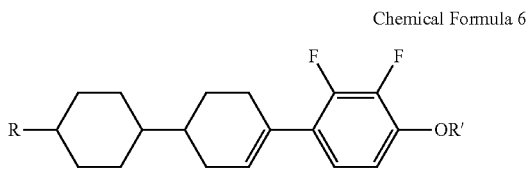

and about 1 to about 15 parts, by weight, of a compound represented by Chemical Formula 7:

Chemical Formula 7

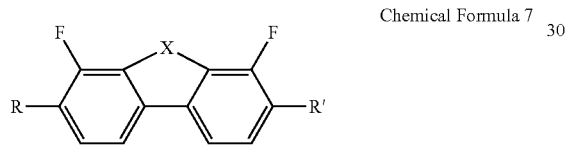

with respect to 100 parts by weight of the entire composition, wherein R and R' are each, independently from one another, an alkyl or alkenyl group having a total number of carbon atoms in the alkenyl group in a range of 2 to 7 for R and R' in each individual compound in Chemical Formulas 1 to 7, and having a total number of carbon atoms in the alkyl group in a range of 1 to 7 for R and R' in each individual compound in Chemical Formulas 1 to 7, and X is S in Chemical Formula 7, and wherein the liquid crystal composition has a refractive index anisotropy of about 0.097 to about 0.137, wherein the liquid crystal composition has a nematic phase-iosotropic transition temperature of 74 degrees C., and wherein the liquid crystal composition has a rotational viscosity of 75.

2. The composition of claim 1, wherein the compound represented by Chemical Formula 1 comprises a first compound in which R and R' are, independently from one another, alkyl groups, and a second compound in which R is an alkyl group and R' is an alkenyl group.

3. The composition of claim 2, wherein the content of the second compound is about 18 to about 36 parts, by weight, with respect to 100 parts, by weight, of the compound represented by Chemical Formula 1.

4. The composition of claim 1, further comprising a compound represented by Chemical Formula 8:

Chemical Formula 8

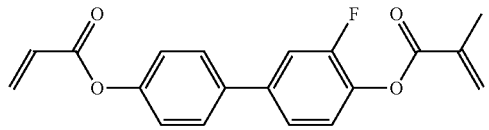

5. The composition of claim 4, wherein the content of the compound represented by Chemical Formula 8 is about 0.2 to about 0.5 parts by weight with respect to 100 parts by weight of the liquid crystal composition.

6. The composition of claim 1, wherein the liquid crystal composition has a dielectric anisotropy of about −3.2 to about −2.2.

7. The composition of claim 1, wherein the liquid crystal composition has an elastic modulus of about 13 to about 17 pN.

8. A display device, comprising:
a first substrate including a pixel electrode;
a second substrate including a common electrode; and
a display panel interposed between the first substrate and the second substrate, and including a liquid crystal layer,
wherein the display panel has a phase difference of about 285 to about 325 nm, and the liquid crystal layer comprises a liquid crystal composition having a refractive index anisotropy of about 0.097 to about 0.137, a dielectric anisotropy of about −3.2 to about −2.2 and an elastic modulus (K33) of about 13 to about 17 pN,
wherein the liquid crystal composition further comprises a compound represented by Chemical Formula 7:

Chemical Formula 7

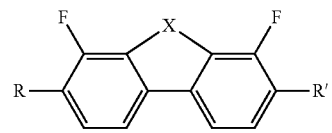

R and R' are each, independently from one another, an alkyl or alkenyl group having a total number of carbon atoms in the alkenyl group in a range of 2 to 7 for R and R' in each individual compound in Chemical Formulas 1 to 7, and having a total number of carbon atoms in the alkyl group in a range of 1 to 7 for R and R' in each individual compound in Chemical Formulas 1 to 7, and wherein the liquid crystal composition has a refractive index anisotropy of about 0.097 to about 0.137, wherein the liquid crystal composition has a nematic phase-iosotropic transition temperature of 74 degrees C., and wherein the liquid crystal composition has a rotational viscosity of 75.

9. The device of claim 8, wherein the liquid crystal layer has a cell gap of about 2.0 to about 2.6 μm.

10. The device of claim 8, wherein the liquid crystal composition comprises a compound represented by Chemical Formula 6:

Chemical Formula 6

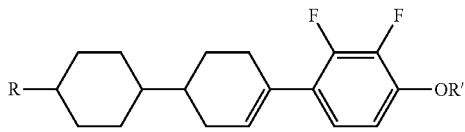

wherein R and R' are each independently an alkyl or alkenyl group having 1 to 7 carbon atoms in Formula 6.

11. The device of claim 10, wherein the compound represented by Chemical Formula 6 is included in about 1 to about 8 parts, by weight, with respect to 100 parts, by weight, of the liquid crystal composition.

12. The device of claim 10, wherein the compound represented by Chemical Formula 7 is included of about 1 to about 15 parts, by weight, with respect to 100 parts, by weight, of the liquid crystal composition.

13. The device of claim 10, wherein the liquid crystal composition further comprises,
about 20 to about 60 parts, by weight, of at least one compound represented by Chemical Formula 1;

Chemical Formula 1

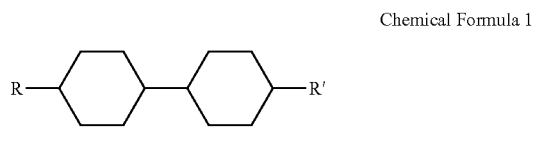

about 5 to about 18 parts, by weight, of a compound represented by Chemical Formula 2;

Chemical Formula 2

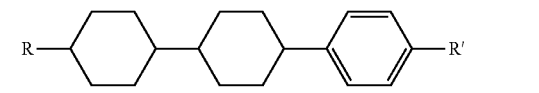

about 5 to about 18 parts, by weight, of a compound represented by Chemical Formula 3;

Chemical Formula 3

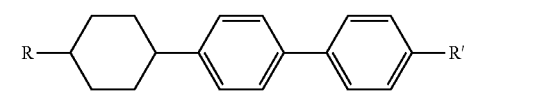

about 5 to about 35 parts, by weight, of a compound represented by Chemical Formula 4; and Chemical Formula 4

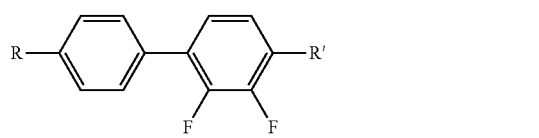

about 1 to about 8 parts, by weight, of a compound represented by Chemical Formula 5:

Chemical Formula 5

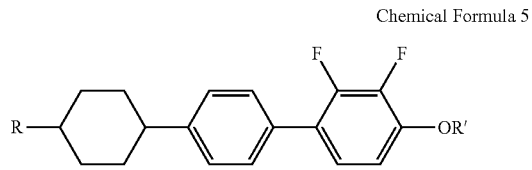

with respect to 100 parts, by weight, of the liquid crystal composition,

R and R' are each, independently from one another, an alkyl or alkenyl group having 1 to 7 carbon atoms in Chemical Formulas 1 to 5.

14. The device of claim 13, wherein the compound represented by Chemical Formula 1 comprises a first compound in which R and R', independently from one another, are alkyl groups, and a second compound in which R is an alkyl group, and R' is an alkyl group if R is an alkenyl group and R' is an alkenyl group.

15. The device of claim 14, wherein the content of the second compound is about 18 to about 36 parts, by weight, with respect to 100 parts, by weight, of the compound represented by Chemical Formula 1.

16. The device of claim 13, wherein the liquid crystal composition further comprises a compound represented by Chemical Formula 8:

Chemical Formula 8

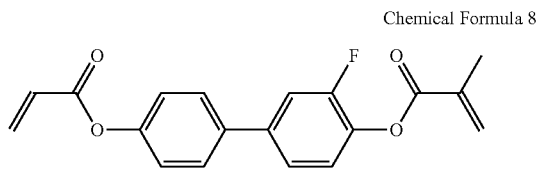 [SMILES: C=CC(=O)Oc1ccc(-c2ccc(OC(=O)C(=C)C)c(F)c2)cc1]

17. The device of claim 16, wherein the content of the compound represented by Chemical Formula 8 is included about 0.2 to about 0.5 parts, by weight, with respect to 100 parts, by weight, of the liquid crystal composition.

18. The device of claim 16, wherein the liquid crystal layer comprises liquid crystals aligned to have a pre-tilt angle through a polymer network comprising the polymer of reactive mesogens represented by Chemical Formula 8.

19. The device of claim 16, wherein the compound represented by Chemical Formula 8 does not form a polymer network.

20. The composition of claim 4, wherein the compound represented by Chemical Formula 8 forms a polymer network.

\* \* \* \* \*